Oct. 1, 1940.  A. BRZYKCY  2,216,529
ANIMAL TRAP
Filed Sept. 25, 1939

Inventor
Antoni Brzykcy
By his Attorneys
Merchant & Merchant

Patented Oct. 1, 1940

2,216,529

UNITED STATES PATENT OFFICE 2,216,529

ANIMAL TRAP

Antoni Brzykcy, Minneapolis, Minn.

Application September 25, 1939, Serial No. 296,439

2 Claims. (Cl. 43—81)

My invention provides an improved animal trap and, generally stated consists of the novel devices, combination of devices and arrangements of parts hereinafter described and defined in the claims.

This animal trap may be made in various different sizes according to the character of the animal or varmint that it may be desirable to catch in the trap. For convenience the trap will be usually designated as a rat trap. The conventional animals traps hitherto constructed have been provided with a trigger or tripping element that carries and supports the bait so that the weight of the bait will vary the tripping action in that if the bait is heavy it is likely to make the set trap so easily tripped that it will be accidentally set off by jarring or handling even before the trap is engaged by the animal.

My invention provides a trap in which the bait will be supported on the base plate in such a manner that its weight has nothing to do with the tripping of the trap. As an important element the trigger or tripping member, which is preferably in the form of a plate or frame, is so associated with the independently supported bait that it will necessarily be engaged and tripped by the rat or other animal that may attempt to reach the bait. This trigger or tripping plate, in the preferred form of the device, completely surrounds and encloses the bait, but in any event it will be interposed in the only approach to the bait so that the trap will necessarily be tripped by any animal that reaches the bait or closely approaches the bait.

A commercal form of the improved trap is illustrated in the accompanying drawing wherein like characters indicate like parts throughout the several views.

Referring to the drawing.

Figure 1:
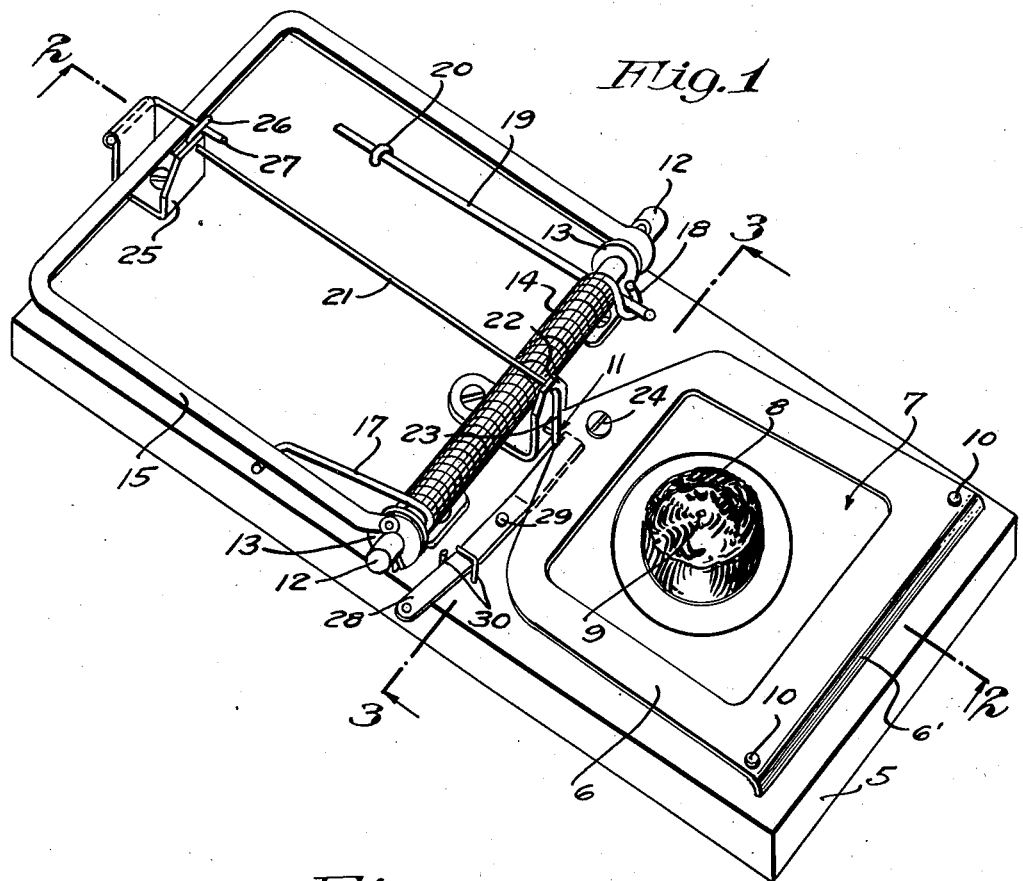
Fig. 1 is a view in perspective showing the improved trap with the bait applied and with the trap set for tripping action.

The base plate 5 which, as shown, is a flat board, is of rectangular form and may be made of wood or any other suitable material. The trigger plate 6 is preferably a substantially rectangular light sheet metal structure having a large opening 7 that exposes a sufficient portion of the plate 5 to support the bait 8. This bait may be loosely rested on the base plate within the opening 7, or it may be lightly secured to the base plate by a tack 9, or the like. At its front edge, the trigger plate has a down-turned fulcrum-acting flange 6' that rests loosely on the base plate. Small nails 10, or the like, loosely driven through the trigger plate close to the flange 6', hold the trigger plate against shifting movements but free for slight vertical rocking movements on the fulcrum flange. At its rear or inner edge, the trigger plate 6 is formed with a stop lug or projection 11, the purpose of which will hereinafter appear.

A hinge rod 12 extends transversely of the base plate and is supported therefrom by lug-like brackets 13. Surrounding the rod 12, between the brackets 13, is a coiled torque spring 14.

The impaling jaw of this trap is, in this preferred structure, in the form of a heavy rod-like bail 15, the ends of which are formed with eyes 16 that are freely pivoted on the rod 12. The torque spring 14, at one end, has an arm-like extension 17, the end of which is engaged under one prong of the impaling bail 15; and the other end of which spring is provided with a hook 18 that engages one end of an anchoring rod 19, the extended end of which is shown as secured to the base plate by a staple 20, or the like. Here it will be noted that the spring 14 exerts a force on the impaling bail or jaw 15 that will throw said bail, when released, violently and with great force from its retracted or set position, shown in the drawing, into a position against the front end of the board immediately around the trigger plate or member 6.

Figure 2:
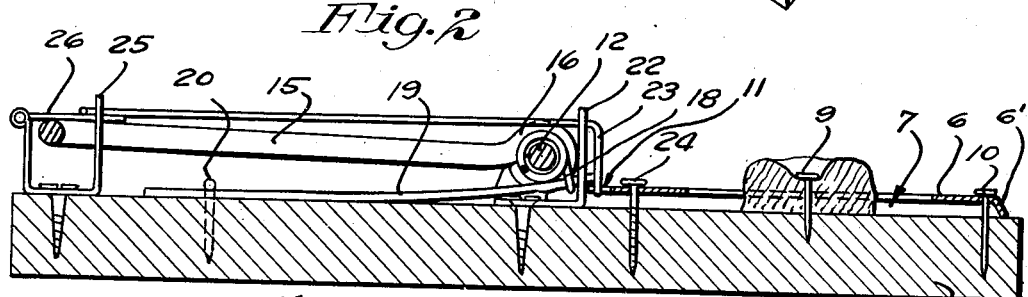
Fig. 2 is a longitudinal section taken on the line 2—2 of Fig. 1.
Figure 3:
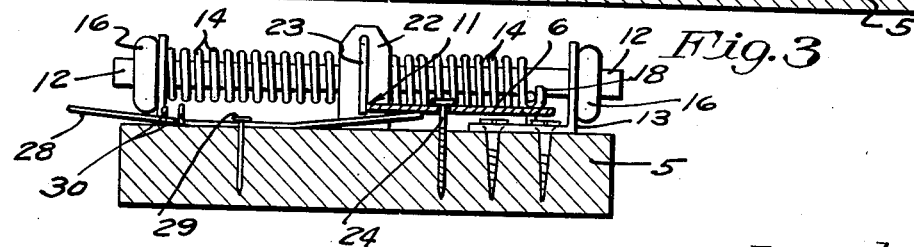
Fig. 3 is a transverse section taken on the line 3—3 of Fig. 1.

The impaling bail is adapted to be set and secured in its retracted position shown in Fig. 1 by a latch structure which, in its preferred form, involves primary and secondary latch elements. The primary latch element is in the form of a rock shaft or rod 21 which, at its front end, is pivoted in an upstanding flange of a bracket 22 secured on the base plate adjacent to the rear edge of the trigger plate; and this front end of latch rod 21 has a depending arm 23, the depending end of which will engage against the stop or latch lug 11 of the trigger plate when the rear end of the latter is raised, as shown in the drawing. Extreme upward movement of the rear edge or portion of the trigger plate 6 is limited by a stop screw or nail 24 that works freely through a perforation in said trigger plate, note particularly Fig. 2. The rear end of primary trip rod or member 21 works through one flange of a U-shaped bracket 25 secured on the rear end portion of the base plate 5; and the rear end of this rod 21 has a short, laterally bent arm or finger 26 that is adapted to overlie the forwardly projecting end of an L-shaped secondary latch element 27, the transverse portion of which latter is pivoted in the rear or outer flange of bracket 25.

When the latch elements 21 and 27 are set, as best shown in Fig. 1, the arm 23 of rod 21 will be tightly pressed against the stop lug 11 of the trigger plate, thereby holding said element 21 against oscillation; and the rear arm or finger 26 of latch element 21 will engage the forwardly projecting arm of the secondary element 27 and hold the same down and thereby cause said secondary element 27 to hold the impaling bail against movement under the action of the spring 14. When, however, the trigger plate is very slightly depressed, the stop lug 11, will be forced below the depending end of arm 23, thereby releasing the rod 21 and causing the latter to release the secondary element 27, with the obvious result that the impaling bail will be released and, under the action of the torque spring 14, will be violently forced against the front portion of the base plate and thus catch and trap the animal who, in attempting to reach the bait, must have depressed the trigger plate, as stated.

As a safety device for setting the trap, I further provide a trap-setting element preferably in the form of a small lever 28 that is intermediately pivoted to the base plate 5 at 29. This lever 28 is shown as held against horizontal pivotal movements by guide pins 30 applied on the board. The inner end of lever 28 projects under the free rear portion of trigger plate 6 so that when the outer end of said lever is depressed, the rear portion of the trigger plate will be raised as far as permitted by the stop screw or element 24, and in which position the lug 11 will be moved into the path of the lower end of the depending arm 23 of latch element 21. The use of this setting lever removes all danger of the operator being cut or hurt by accidental releasing of the tripping bail while the trap is being set.

The screw 24 performs two functions, to wit, it regulates the height of the free rear edge of the trigger plate for proper engagement with the arm 23, and it holds the trigger plate against lateral shifting movements. With the arrangement described the tension of the torque spring 14 may be adjusted for different tensions simply by twisting the spring and turning the hook 18 thereof into engagement with the anchor rod 19 in different positions.

A preferred form of the trap is illustrated in the drawings and has been described in detail, but it will be understood that the trap is capable of various modifications as to details of construction and arrangement of parts within the scope of the invention herein claimed.

What I claim is:

1. An animal trap comprising a base, a vertically depressible latch plate mounted on said base and provided with a projecting stop lug, a spring impelled impaling jaw pivoted to said base and under spring tension, a primary latch rod pivotally mounted on the base and provided at one end with a depending arm adapted to engage the stop lug of said latch plate only when the latter is raised, said latch rod, at its other end, having a laterally projecting arm, a secondary latch pivotally mounted on the base and having an arm engageable over the free end portion of said jaw when the latter is set under spring tension, and to hold said jaw set when the arm of said secondary latch is engaged and held down by the co-operating arm of said primary latch rod while the other arm of said primary latch rod is engaged with the stop lug of said latch plate.

2. In an animal trap, a base, a hinge rod mounted on said base, an impaling bail pivotally mounted on said hinge rod, a coiled torsion spring mounted on said hinge rod and provided at one end with a projecting arm that operates on said bail, said spring, at its other end, having a terminal loop acting as a short arm, an anchoring rod detachably extended through the loop of said spring and having a base of reaction against said base.

ANTONI BRZYKCY.